Nov. 6, 1962

R. L. WHITE 3,063,001

ZENER DIODE RECTIFIER AND REGULATOR CIRCUITS

Filed April 7, 1959

RICHARD L. WHITE
INVENTOR.

BY

ATTORNEY

United States Patent Office 3,063,001
Patented Nov. 6, 1962

3,063,001
ZENER DIODE RECTIFIER AND REGULATOR CIRCUITS
Richard L. White, Skokie, Ill., assignor to Hoffman Electronics Corporation, a corporation of California
Filed Apr. 7, 1959, Ser. No. 804,746
7 Claims. (Cl. 321—16)

The present invention relates to rectifiers and regulators, and more particularly to electronic rectifiers and regulators utilizing Zener diodes.

Rectifiers and regulators are well known, but there is a great need for a simple, economical combination rectifier-regulator circuit utilizing Zener diodes.

It is an object of the present invention, therefore, to provide a novel combination rectifier and regulator circuit.

It is another object of the present invention to provide a combination rectifier-regulator circuit utilizing Zener diodes.

According to the present invention, a combination rectifier-regulator circuit comprises two Zener diodes coupled across the secondary winding of a transformer. The output voltage is obtained from the junction between the free ends of the two Zener diodes.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, FIGURE 1 is a schematic diagram of a device according to the present invention.

Figure 2:
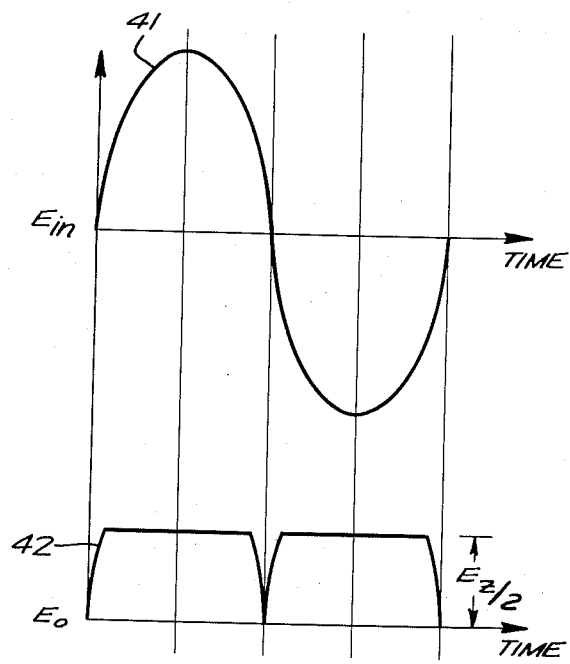

FIGURE 2 is a graph comparing input voltage with output voltage.

Figure 1:
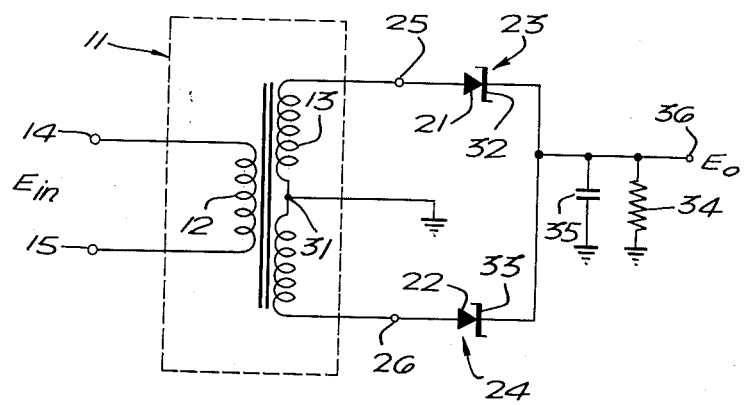

Referring now to the drawings, FIGURE 1 shows transformer 11 having primary winding 12 and secondary winding 13. The input voltage is applied across primary terminals 14 and 15. Anodes 21 and 22 of Zener diodes 23 and 24, respectively, are connected to secondary terminals 25 and 26, respectively. Mid-point 31 of secondary winding 13 is grounded. Cathodes 32 and 33 of Zener diodes 23 and 24, respectively, are connected to each other, to one end each of resistor 34 and capacitor 35, the other ends of which are grounded, and to output terminal 36.

When an input voltage is applied across primary terminals 14 and 15 so as to drive secondary terminal 25 positive with respect to secondary terminal 26, current passes through forward-biased Zener diode 23, but not through reverse-biased Zener diode 24. The output voltage at output terminal 36 will increase as the input voltage increases, until Zener breakdown occurs for Zener diode 24. Thereafter, although the input voltage continues to increase, the output voltage remains constant, since current can then easily pass in the reverse direction through Zener diode 24. If the input voltage then decreases, the output voltage will remain constant until Zener diode 24 stops conducting, after which time the output voltage will decrease to zero. If the input voltage drives secondary terminal 26 positive with respect to secondary terminal 25 the output voltage will go positive and then remain constant for the same reasons already explained, with the roles of Zener diodes 23 and 24 reversed. It is desirable that diodes 23 and 24 have equal Zener breakdown voltages, in order to reduce the ripple and to simplify filtering.

FIGURE 2 shows the relationship between input voltage waveform 41 and output voltage waveform 42, both being plotted against time. Voltage $E_z$ is the Zener breakdown voltage.

It can be seen from FIGURE 2 that the circuit of FIGURE 1 rectifies the input voltage. It is also apparent that the magnitude of the output voltage is largely dependent upon the Zener breakdown voltage of diodes 23 and 24, and largely independent of fluctuations in the magnitude of the input voltage. Thus, the circuit of FIGURE 1 operates as both a rectifier and a regulator.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Apparatus for the rectification and regulation of an input signal of varying voltage, comprising: a transformer having a primary winding for the reception of said input signal and a secondary winding having a tap coupled to a common reference potential; an impedance having first and second leads, said first lead being coupled to said common reference potential; first and second Zener diodes, each having first and second elements; and an output lead, said first elements being coupled, respectively, to said secondary winding on opposite sides of said tap, and said second elements being coupled together, to said second lead, and to said output lead.

2. Apparatus as defined in claim 1 in which said first elements are anodes, said second elements are cathodes, said tap is a center tap, and said anodes are coupled to said secondary winding equidistant from said tap.

3. A combined full-wave rectifier and output voltage regulator comprising means defining end terminals and a center-tap terminal for supplying therebetween symmetrical alternating current components relative to the potential of said center-tap terminal, a pair of Zener diode devices connected in series opposition directly between said end terminals, and means for deriving a full-wave rectified output current wave between said center-tap terminal and a point electrically mid-way between the series-connected Zener diode devices.

4. Apparatus in accordance with claim 3, in which the last-named means comprises an output impedance.

5. A combined full-wave rectifier and output voltage regulator comprising means defining end terminals and a center-tap terminal for supplying therebetween symmetrical alternating current components relative to the potential of said center-tap terminal, a pair of Zener diode devices connected in series opposition between said end terminals, and means for deriving a full-wave rectified output current wave between said center-tap terminal and a point electrically mid-way between the series-connected Zener diode devices; said devices constituting the sole active elements in circuit between said end terminals.

6. A combined full-wave rectifier and output voltage regulator comprising means defining end terminals and a center-tap terminal for supplying therebetween symmetrical alternating current components relative to the potential of said center-tap terminal, a pair of Zener diode devices connected in series opposition between said end terminals, and means for deriving a full-wave rectified output current wave between said center-tap terminal and a point electrically mid-way between the series-connected Zener diode devices; said devices constituting the only asymmetrically conducting elements in circuit between said end terminals.

7. Apparatus in accordance with claim 6, in which said devices have matched inverse-conduction characteristics including an inverse-conduction threshold voltage substantially lower than the maximum amplitudes of said alternating current components.

References Cited in the file of this patent

UNITED STATES PATENTS

| | | |
|---|---|---|
| 1,720,662 | Burke | July 16, 1929 |
| 2,829,282 | Hughes et al. | Apr. 1, 1958 |
| 2,854,651 | Kircher | Sept. 30, 1958 |
| 2,881,382 | Amato | Apr. 7, 1959 |
| 2,903,636 | Guyton | Sept. 8, 1959 |

FOREIGN PATENTS

| | | |
|---|---|---|
| 473,276 | Great Britain | Oct. 11, 1937 |